US012667792B2

(12) United States Patent
Cenni

(10) Patent No.: US 12,667,792 B2
(45) Date of Patent: Jun. 30, 2026

(54) SPHERICAL COMPARTMENT FOR ENABLING AN INDIVIDUAL TO SAFELY EXPERIENCE A FREEFALL

(71) Applicant: Adrian Cenni, New York City, NY (US)

(72) Inventor: Adrian Cenni, New York City, NY (US)

( * ) Notice: Subject to any disclaimer, the term of this patent is extended or adjusted under 35 U.S.C. 154(b) by 644 days.

(21) Appl. No.: 17/898,254

(22) Filed: Aug. 29, 2022

(65) Prior Publication Data

US 2023/0241520 A1     Aug. 3, 2023

Related U.S. Application Data

(63) Continuation of application No. PCT/US2021/020360, filed on Mar. 1, 2021.

(60) Provisional application No. 62/983,612, filed on Feb. 29, 2020.

(51) Int. Cl.
| | |
|---|---|
| *A63G 31/12* | (2006.01) |
| *A63G 31/00* | (2006.01) |
| *B64D 1/08* | (2006.01) |

(52) U.S. Cl.
CPC ........ *A63G 31/12* (2013.01); *A63G 2031/002* (2013.01); *B64D 1/08* (2013.01)

(58) Field of Classification Search
CPC ........ A63G 23/00; A63G 27/02; A63G 31/00; A63G 31/04; A63G 31/12; A63G 2031/002; B64D 1/08
USPC ........................................................ 472/134
See application file for complete search history.

(56) References Cited

U.S. PATENT DOCUMENTS

| | | | | |
|---|---|---|---|---|
| 3,675,259 | A | 7/1972 | Gilchrist | |
| 3,883,913 | A | 5/1975 | Givens | |
| 4,824,099 | A * | 4/1989 | Rusu | A63G 31/00 |
| | | | | 472/3 |
| 5,060,932 | A * | 10/1991 | Yamaguchi | G09B 9/14 |
| | | | | 434/45 |
| 5,421,128 | A | 6/1995 | Sharpless et al. | |
| 6,086,968 | A | 7/2000 | Horovitz | |
| 6,932,710 | B1 * | 8/2005 | Hartin | A63B 69/0093 |
| | | | | 472/120 |
| 2005/0107174 | A1 * | 5/2005 | Field | A63G 31/12 |
| | | | | 472/134 |

(Continued)

OTHER PUBLICATIONS

USPTO, "International Search Report" and "Written Opinion of the International Searching Authority," International Application No. PCT/US2021/020360 (Jul. 16, 2021).

(Continued)

*Primary Examiner* — Eugene L Kim
(74) *Attorney, Agent, or Firm* — DENTONS Durham Jones Pinegar

(57) ABSTRACT

A spherical compartment is designed to hold a cargo or one or more individuals and absorbing impact as the spherical compartment is dropped from a height. The spherical compartment includes a frame with vertically oriented frame elements and at least one horizontally oriented frame element. The frame elements may be air beams; thus, the frame may be an air frame. The frame may carry a suspension system that suspends the payload within an interior of the spherical compartment. An outer skin affixed to the frame may impart the spherical compartment with low wind resistance. Methods of using the spherical compartment are also disclosed.

14 Claims, 11 Drawing Sheets

(56)                References Cited

U.S. PATENT DOCUMENTS

| | | |
|---|---|---|
| 2008/0078883 A1 | 4/2008 | de Jong |
| 2013/0090176 A1 | 4/2013 | Ochi |
| 2014/0170930 A1* | 6/2014 | Gordon .................. A63H 33/00 |
| | | 446/220 |
| 2017/0158337 A1 | 6/2017 | Erickson |
| 2017/0165583 A1* | 6/2017 | Keller ...................... A63B 9/00 |
| 2017/0203843 A1* | 7/2017 | Chan ......................... B64D 1/08 |
| 2021/0163202 A1* | 6/2021 | Obeyesekere ....... B65D 81/022 |

OTHER PUBLICATIONS

The International Bureau of WIPO, "International Preliminary Report on Patentability," International Application No. PCT/US2021/020360 (Sep. 6, 2022).

* cited by examiner

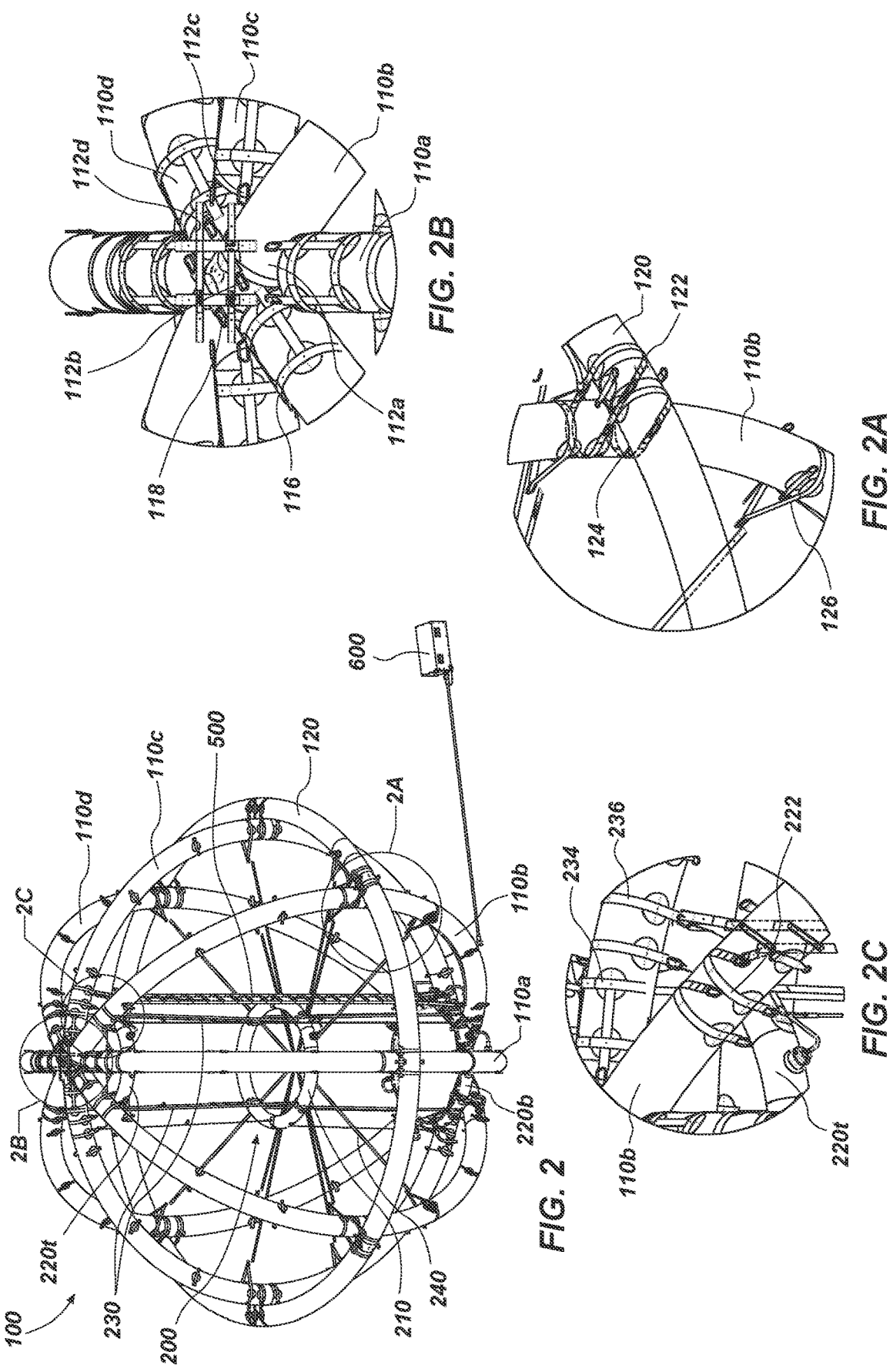

SPHERICAL COMPARTMENT FOR ENABLING AN INDIVIDUAL TO SAFELY EXPERIENCE A FREEFALL

CROSS-REFERENCE TO RELATED APPLICATION

This application is a continuation of International Patent Application No. PCT/US2021/020360, filed Mar. 1, 2021, titled SPHERICAL COMPARTMENT FOR ENABLING AN INDIVIDUAL TO SAFELY EXPERIENCE A FREEFALL ("the '360 PCT Application), which includes a claim for priority to the Feb. 29, 2020 filing date of U.S. Provisional Patent Application No. 62/983,612, titled SPHERICAL COMPARTMENT FOR ENABLING AN INDIVIDUAL TO SAFELY EXPERIENCE A FREEFALL ("the 612' Provisional Application"). The entire disclosures of the '360 PCT Application and the '612 Provisional Application are hereby incorporated herein

TECHNICAL FIELD

This disclosure relates generally to a device for holding one or more individuals and absorbing impact as the individual is dropped from a height and, more specifically, to a device that that will enable the individual(s) therein to experience the thrill of a fall without the danger associated with impacting the ground at the end of the fall. In addition, this disclosure relates to methods for enabling one or more individuals to experience a fall while protecting the individual from an impact with the ground.

RELATED ART

A variety of so-called "extreme" activities involve free falls. Various examples of such extreme activities include skydiving, bungee jumping, and cliff diving. Although safety precautions are often taken during many freefalling activities, accidents are common, as are the injury and death that result from many accidents during freefall activities.

In skydiving, parachutes, including backup parachutes, may fail to slow an individual's descent. When a parachute fails, the individual often hits the ground at an undesirably high velocity. Parachute harnesses may also fail, which may result in removal of the parachute from an individual as the parachute opens and counteracts the individual's descent.

Bungee cords sometimes break or otherwise fail to limit the extent, of distance, of an individual's descent. The bungee cords that are used in bungee jumping are typically designed to prevent an individual from impacting the ground; instead, the elasticity of a bungee cord typically terminates a fall before an individual reaches the ground, shooting the individual back up into the air for a shorter return trip. Bungee jumping harnesses may also fail, resulting in separation of the bungee cord from the individual, thereby preventing the bungee cord from terminating the individual's fall before he or she hits the ground.

Cliff diving requires proper positioning or form to minimize the potentially damaging impacts that may occur with unseen underwater objects as a diver hits the water. Wind gusts, slips by the diver, and the like can also have serious consequences.

DISCLOSURE

In various aspects, devices are disclosed that enable one or more individuals to experience a free fall while minimizing the risk associated with the free fall. An apparatus according to this disclosure may provide one or more individuals with the sensation of being suspended in air while falling, while also absorbing a majority of the impact force the individual(s) would otherwise suffer if he or she were to hit the ground.

In a specific embodiment, an apparatus according to this disclosure comprises a spherical compartment. The spherical compartment may carry at least one individual during an activity, such as a freefall, and may enable the individual(s) to experience the sensations that are typically present during a freefall. In addition, the spherical compartment may limit any impact absorbed by each individual's body as the spherical compartment hits the ground; the spherical compartment instead absorbs a majority of the impact.

The spherical compartment may include a frame, an outer skin, a suspension system, and a platform. In addition, the spherical compartment may include ballast at or near a bottom thereof. In some embodiments, the spherical compartment may also include a conveyor (e.g., a ladder, etc.) within its interior.

The frame of the spherical compartment may also be referred to as an exoskeleton. The frame may include a plurality of frame members. The frame members may have semicircular configurations or, more specifically, semi-toroidal (i.e., doughnut-shaped) configurations. Each frame member may have a rigid, yet flexible construction. In some embodiments, each frame member may comprise a tube. Without limitation, each frame member may comprise an inflatable tube. More specifically, each frame member may comprise a so-called "air beam" structural member. Each frame member (e.g., each bladder thereof, etc.) may be pressurized (e.g., with air, an inert gas, etc.) to a desired stiffness. Thus, the frame of the spherical compartment may be pressurized in a desired manner. Such a frame may be referred to as an "airframe."

A configuration of each frame member and the manner in which the frame members are assembled with each other may impart the frame and, thus, the spherical compartment with sufficient structural stability to withstand a forceful impact without completely flattening. The configuration and flexibility of each frame member and the manner in which the frame members are assembled with each other may impart the frame and, thus, the spherical compartment with sufficient flexibility to absorb at least some of the forces of the impact.

At least some of the frame members may be vertically oriented. Vertically oriented frame members with semicircular or semi-toroidal shapes may be arranged in a manner that forms a frame for the spherical compartment. Thus, the vertically oriented frame members may intersect at a top and a bottom of the spherical compartment, which may also be referred to herein as the top pole and the bottom pole, respectively, of the spherical compartment. More specifically, the vertically oriented frame members may be joined to one another at the top pole and the bottom pole.

A spherical compartment may include six vertically oriented frame members (forming three circles or tori) positioned at intervals of 60° to each other. Alternatively, a spherical compartment may include eight vertically oriented frame members positioned at intervals of 45° to each other. As another alternative, a spherical compartment may include twelve vertically oriented frame members positioned at intervals of 30° to each other. The vertically oriented frame members may be secured to each other at a top pole and a bottom pole of the frame they define. Each vertically oriented frame member may comprise a tube. In a specific embodiment, such a tube may have an outer diameter of 14 inches (about 36 cm), although the use of tubes with other outer diameters are also within the scope of this disclosure. Each tube may be bent into a semicircular or semi-toroidal shape. In a specific embodiment, the vertically oriented members may have lengths that define a spherical compartment with an inner diameter of 25 feet (about 7.6 m), although other sizes of spherical compartments—both smaller and larger—are also within the scope of this disclosure.

Another frame member with a toroidal shape may be oriented horizontally or somewhat horizontally relative to the vertically oriented frame members. Such a horizontally oriented frame member may secure the vertically oriented frame members in position relative to one another. In some embodiments, such a horizontally oriented frame member may be positioned at an equator of the frame of the spherical compartment. In some embodiments, the horizontally oriented frame member may extend around an outside of the frame defined by the vertically oriented frame members, although internally located embodiments are also within the scope of this disclosure.

In a specific embodiment, a spherical compartment includes a horizontally oriented frame member positioned at an equator of the frame defined by the vertically oriented frame members. The horizontally oriented frame member may comprise a tube with an outer diameter of 14 inches (about 36 cm). The tube may be bent into a circular or toroidal shape having an inner diameter of 27 feet (about 8.2 m), enabling it to be positioned around an outside of the frame defined by the vertically oriented frame members. It should be noted that the above-identified dimensions refer to a specific embodiment. Horizontally oriented frame members with smaller or larger outer diameters may also be used; horizontally oriented frame members with lengths that define smaller or larger toroidal shapes and spherical compartments with smaller or larger sizes are also within the scope of this disclosure.

An outer skin of the spherical compartment may be positioned around the frame or between the frame members of the frame. In some embodiments, the outer skin may be formed from a flexible material. The outer skin may have a structure that enables air to flow therein (e.g., it may comprise a breathable material, it may include mesh panels or similar structures that provide for airflow, etc.). In some embodiments the outer skin may be stretched tight over the frame or between the frame members to prevent air resistance from collapsing the outer skin while the spherical compartment falls from a significant height. The material from which the outer skin is formed and the manner in which the outer skin is secured to the frame may contribute to the structural stability of the spherical compartment. In some embodiments, the outer skin may be translucent, at least partially transparent, or transparent, which may enable each individual within the spherical compartment to view his or her surroundings outside of the spherical compartment.

The suspension system of the spherical compartment may suspend the passenger platform within the center of the spherical compartment. Additionally, the suspension system of the spherical compartment may have a configuration that enables it to absorb some of the impact force experienced by the spherical object at the end of a fall; for example, the suspension system may absorb some of the impact force experienced by the spherical compartment when it hits the ground or another surface. The suspension system may allow for some movement of the passenger platform within the interior of the spherical compartment.

The suspension system may include a plurality of suspension elements. The suspension elements may comprise elongated elements that extend across an interior of the spherical compartment. More specifically, each suspension element may have some elasticity.

Vertically oriented suspension elements may extend between the top pole and the bottom pole of the spherical compartment. More specifically, a spherical compartment may include a suspension system with upper vertically oriented suspension elements and lower vertically oriented suspension elements. In addition, the suspension system may include an upper anchor ring and a lower anchor ring. The upper anchor ring may be located within and secured to the frame at a location adjacent to the top pole. The lower anchor ring may be located within and secured to the frame at a location adjacent to the bottom pole. An upper portion (e.g., an upper end, etc.) of each upper vertically oriented suspension element may be secured to the upper anchor ring. A central portion (e.g., a lower end, etc.) of each upper vertically oriented suspension element may be secured to the passenger platform. Likewise, a central portion (e.g., an upper end, etc.) of each lower vertically oriented suspension element may be secured to the passenger platform, while a lower portion (e.g., a lower end, etc.) of each lower vertically oriented suspension element may be secured to the lower anchor ring.

The suspension system may also include a plurality of horizontally oriented suspension elements. Each horizontally oriented suspension element may extend substantially horizontally across an interior of the frame of the spherical compartment. Opposite ends of each horizontally oriented suspension element may be secured to opposed vertically oriented frame members. In some embodiments, the opposite ends of each horizontally oriented suspension member may be secured to the horizontally oriented frame member. The horizontally oriented suspension elements may extend beneath the passenger platform to support the passenger platform from below.

The passenger platform may be suspended substantially centrally within the airframe to accommodate at least one individual. More specifically, the passenger platform may accommodate a safety restraint system (e.g., a seating system, etc.) for each individual. In some embodiments, the passenger platform may accommodate a single individual. In other embodiments, the passenger platform may accommodate a plurality of individuals (e.g., two people, three people, etc.). The passenger platform may, in conjunction with the suspension system, move within any of three dimensions within an interior of the spherical compartment to minimize the impact forces experienced by each individual carried by the passenger platform as the spherical compartment impacts the ground or another surface at the end of a fall.

The ballast of a spherical compartment according to this disclosure may orient the top pole substantially upward and the bottom pole substantially downward as the spherical object falls under force of gravity through the sky, toward the ground. In some embodiments, the ballast may be located within the frame, adjacent to the bottom pole of the spherical compartment.

In some embodiments, the spherical compartment may include life support (e.g., an oxygenated air supply, a heater, a cooling system, etc.) for its individual occupants. The life support within the spherical compartment may be confined to the individual occupant(s) and the equipment used by the individual occupant(s). The inclusion of life support is particularly useful in situations where the spherical compartment will protect one or more individuals as they are dropped from a high altitude.

On Earth, when a spherical compartment having an outer diameter of about 30 feet (about 9.1 m) is dropped from above Earth's surface, it may have a terminal velocity of about 33 miles per hour (mph) (about 53 km/h) at sea level. When an embodiment of such a spherical compartment that includes all of the features described herein and a weight of about 1,500 pounds (about 680 kg) to about 2,000 pounds (about 900 kg) hits the ground or another surface under force of Earth's gravity, the passengers or contents of the spherical compartment will experience a rebound force of about 8.4 g (gravitational force equivalent).

In use, a spherical compartment according to this disclosure may protect its contents as they are dropped and allowed to freefall. When used on Earth, the spherical compartment may be dropped from several feet (e.g., tens of feet, hundreds of feet, thousands of feet, miles, etc.). As a specific example, the spherical compartment may be dropped from a distance of 100 feet (about 30.5 m) or more (e.g., 125 feet (about 38 m), 200 feet (about 61 m), 250 feet (about 75 m), 500 feet (about 150 m), etc.). More broadly, the spherical compartment may be dropped to Earth from any location within the inner layers of Earth's atmosphere (e.g., from within the Mesosphere, which extends to an altitude of about 53 miles (about 83 km) above Earth; the Stratosphere, which extends to about 31 miles (about 50 km) above Earth; and the Troposphere, which extends to about 33,000 feet, or 6.2 miles (about 10 km), above Earth's surface).

In some embodiments, a spherical compartment may protect one or more individuals during freefall. In such uses, the spherical compartment may comprise a life-saving escape vehicle that may be used in emergency situations to safely transport an individual from the sky (e.g., from an airplane, from an extra-atmospheric vehicle, etc.). The spherical compartment may safely transport individuals who have not been trained to use a parachute from an aircraft to Earth's surface. Spherical compartments that include life support systems may be used to safely transport individuals from low-oxygen environments high above Earth to the ground.

A spherical compartment may also be used to provide one or more individuals with a thrilling adventure, such as a drop from a crane that carries the spherical compartment tens or hundreds of feet or meters above the ground or a drop from an aircraft at an elevation of hundreds, thousands, or tens of thousands of feet or meters above ground.

In other embodiments, a spherical compartment according to this disclosure may be used to drop a payload (e.g., equipment, supplies, etc.). As an example, a spherical compartment may be used to drop a payload from an aircraft (e.g., an airplane, a glider, a helicopter, an unmanned aerial vehicle (UAV), etc.) to a desired location on Earth, which desired location may not be readily accessible to the aircraft. As another example, a spherical compartment may be used to drop equipment or supplies from space to the surface of a planet or another object in space.

Other aspects of the disclosure, as well as features and advantages of various aspects of the disclosed subject matter should be apparent to those of ordinary skill in the art through consideration of the foregoing disclosure, ensuing description, the accompanying drawings, and the appended claims.

BRIEF DESCRIPTION OF THE DRAWINGS

FIG. 2 is an isometric view of an embodiment of a frame of the embodiment of spherical compartment shown in FIG. 1;

FIG. 2A provides a detailed view of an embodiment of the manner in which a top anchor ring is secured to vertically oriented frame members near the top of the embodiment of frame shown in FIG. 2;

FIG. 2B provides a detailed view of an embodiment of the manner in which ends of the vertically oriented frame members are secured to each other at the top of the embodiment of frame shown in FIG. 2;

FIG. 2C provides a detailed view of an embodiment of the manner in which a horizontally oriented frame member is secured to a vertically oriented frame member of the embodiment of frame shown in FIG. 2;

DETAILED DESCRIPTION

Figure 1:
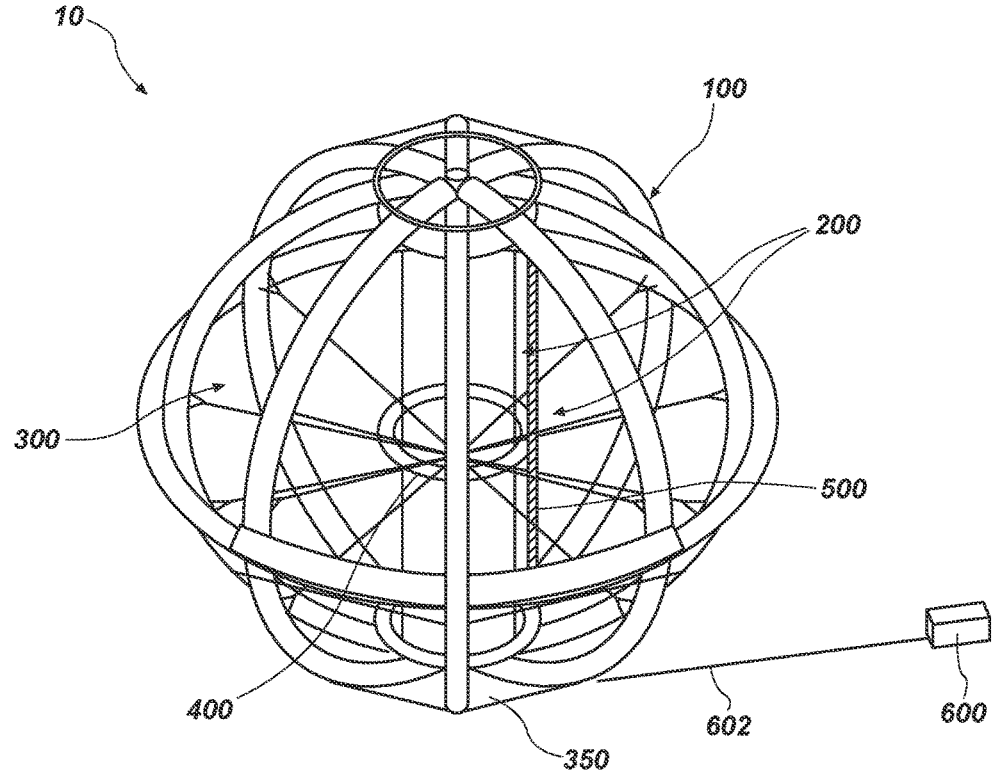
FIG. 1 is an isometric view of an embodiment of a spherical compartment according to this disclosure.

FIG. 1 illustrates a specific embodiment of spherical compartment 10 according to this disclosure. Generally, the spherical compartment 10 includes a frame 100, a suspension system 200 carried by the frame 100, and an outer skin 300 covering the frame 100. Optionally, the spherical compartment 10 may include one or more of a ballast 350 at a base of the spherical compartment 10, a conveyor 500 within an interior of the spherical compartment and associated with its suspension system 200, and a pressurization system 600 associated with the frame 100 and/or an interior of the spherical compartment 10.

With reference to FIGS. 2-5, an embodiment of the frame 100 of the spherical compartment 10 is illustrated. Generally, the frame 100 includes a plurality of vertically oriented frame members 110a, 110b, 110c, etc., which are also referred to herein as frame members 110, as well as one or more horizontally oriented frame members 120. Each vertically oriented frame member 110 may have a semicircular configuration or, more specifically, a semi-toroidal (i.e., doughnut-shaped) configuration. Each horizontally oriented frame member 120 may have a circular configuration or, more specifically, a toroidal configuration.

Each vertically oriented frame member 110 and each horizontally oriented frame member 120 may have a rigid, yet flexible construction. In some embodiments, each vertically oriented frame member 110 and each horizontally oriented frame member 120 may comprise a tube. Without limitation, each vertically oriented frame member 110 and each horizontally oriented frame member 120 may comprise an inflatable or pressurizable tube. More specifically, each vertically oriented frame member 110 and each horizontally oriented frame member 120 may comprise a so-called "air beam" structural member, a non-limiting example of which is disclosed by U.S. Pat. No. 5,421,128 of Sharpless et al., the entire disclosure of which is hereby incorporated by reference. Such an air beam may comprise a tube with an outer member formed from a suitable material that surrounds one or more inflatable inner members. The outer member of the tube may comprise woven fibers or yarns impregnated with a matrix material, such as the impregnated woven materials disclosed by U.S. Pat. No. 6,086,968 of Horovitz, the entire disclosure of which is hereby incorporated herein. Examples of fibers that may be woven to define the outer member include, without limitation, polyester, p-phenylene terephthalamide (PpPTA) (e.g., that available from Akzo as TWARON), poly-p-phenylene terephthalamide (PPTA) (e.g., that available from DuPont as KEVLAR), and polytrimethylene terephthalate (e.g., that available from Shell as CORTERRA). These and other woven fibers may be impregnated with any suitable material, for example, cis-polyisoprene, polyurethane, epoxy, or polyvinylchloride. Such a woven material may have strong non-stretch properties in part due to the weave process used to form it. Non-limiting examples of inflatable inner members of an air frame include bladders (e.g., urethane film bladders, etc.), inner tubes (e.g., polyisobutylene, or butyl rubber, inner tubes, etc.), and the like. Various embodiments of such air beams are available from Federal-Fabrics-Fibers, Inc., of Lowell, Massachusetts. Of course, other configurations of air beams, including, but not limited to, air beams with integrated inner and outer structures, may also be used to define the frame members of a frame of a spherical compartment according to this disclosure. Each vertically oriented frame member 110 and each horizontally oriented frame member 120 (e.g., each bladder thereof, etc.) may be pressurized (e.g., with air, an inert gas, etc.) to a desired stiffness. Thus, the frame 100 of the spherical compartment 10 (FIG. 1) may be pressurized in a desired manner. Such a frame 100 may be referred to as an "airframe."

The vertically oriented frame members 110 may be arranged in a manner that forms a frame 100 for a spherical compartment. Thus, the vertically oriented frame members 110 may intersect at a top and a bottom of the spherical compartment 10 (FIG. 1), which may also be referred to herein as the top pole and the bottom pole, respectively, of the spherical compartment. More specifically, the vertically oriented frame members 110 may be joined to one another at the top pole and the bottom pole of the spherical compartment 10.

The frame 100 may include six vertically oriented frame members 110 (forming three circles or tori) positioned at intervals of 60° to each other. Alternatively, the frame may include eight vertically oriented frame members 110 positioned at intervals of 45° to each other. As another alternative, the frame 110 may include twelve vertically oriented frame members positioned at intervals of 30° to each other. The vertically oriented frame members 110 may be secured to each other at a top pole and a bottom pole of the frame 100. Again, each vertically oriented frame 110 member may comprise a tube. In a specific embodiment, such a tube may have an outer diameter of 14 inches (about 36 cm), although the use of tubes with other outer diameters are also within the scope of this disclosure. Each tube may be bent into a semicircular or semi-toroidal shape. In a specific embodiment, the vertically oriented members may have lengths that define a spherical compartment with an inner diameter of 25 feet (about 7.6 m), although other sizes of spherical compartments—both smaller and larger—are also within the scope of this disclosure.

Each horizontally oriented frame member 120 may be oriented horizontally or somewhat horizontally relative to the vertically oriented frame members 110. Such a horizontally oriented frame member 120 may secure the vertically oriented frame members 110 in position relative to one another. In some embodiments, such a horizontally oriented frame member 120 may be positioned at an equator of the frame 100. In some embodiments, the horizontally oriented frame member 120 may extend around an outside of the frame 100 defined by the vertically oriented frame members 110, although internally located embodiments of horizontally oriented frame members 120 are also within the scope of this disclosure.

In a specific embodiment, the horizontally oriented frame member 120 is positioned at an equator of the frame 100. The horizontally oriented frame member 120 may comprise a tube with an outer diameter of 14 inches (about 36 cm). The tube may be bent into a circular or toroidal shape having an inner diameter of 27 feet (about 8.2 m), enabling it to be positioned around an outside of the frame defined by the vertically oriented frame members. It should be noted that the above-identified dimensions refer to a specific embodiment. Horizontally oriented frame members 120 with smaller or larger outer diameters may also be used; horizontally oriented frame members 120 with lengths that define smaller or larger toroidal shapes and spherical compartments with smaller or larger sizes are also within the scope of this disclosure.

FIG. 2A illustrates an embodiment of a coupling element 122 along the length of the horizontally oriented frame member 120, an embodiment of a coupling element 126 along the length of a vertically oriented frame member 110b, and an embodiment of a coupling element 124 that secures the vertically oriented frame member 110 to the horizontally oriented frame member 120; e.g., by way of the coupling elements 122 and 126. FIG. 2B illustrates an embodiment of a coupling element 116 at an upper end 112a, 112b, 112c, etc. (also referred to herein as ends 112) of each vertically oriented frame member 110a, 110b, 110c, etc., respectively, and an embodiment of a coupling element 118 that secures the ends 112 of the vertically oriented frame members 110 to each other; e.g., by way of the coupling elements 116 on the ends 112 of the vertically oriented frame members 110. Each coupling element 116, 118, 122, 124, 126 may comprise webbing (i.e., nylon straps, etc.), o-rings, carabiners, etc., or combinations thereof that secure the elements of the frame 110 to each other in a manner that will withstand the forces to which the spherical compartment 10 (FIG. 1) is expected to be subjected.

FIGS. 2-5 also depict an embodiment of a suspension system 200 of the spherical compartment 10 (FIG. 1). The suspension system 200 may include an upper anchor ring 220t, a lower anchor ring 220b, a platform 210 between upper anchor ring 220t and the lower anchor ring 220b, vertically oriented suspension elements 230, and horizontally oriented suspension elements 240.

The upper anchor ring 220t may be located within and secured to the frame 100 at a location adjacent to the top pole. The lower anchor ring 220b may be located within and secured to the frame 100 at a location adjacent to the bottom pole.

Each upper anchor ring 220t and lower anchor ring 220b may be oriented horizontally or somewhat horizontally relative to the vertically oriented frame members 110. Each upper anchor ring 220t and lower anchor ring 220b may be secured to inner extents of each of the vertically oriented frame members 110. In a specific embodiment, each upper anchor ring 220t and lower anchor ring 220b, as well as the platform 210, may comprise a tube with an outer diameter of 12 inches (about 30 cm). The tube may be bent into a circular or toroidal shape and positioned within an interior of the frame 100, respectively near the top and bottom of the frame 100. It should be noted that the above-identified dimensions refer to a specific embodiment. Upper anchor rings 220t, lower anchor rings 220b, and platforms 210 with smaller or larger outer diameters may also be used.

Each vertically oriented suspension element 230 and each horizontally oriented suspension element 240 may comprise an elongated element that extends across an interior of the frame 100. In some embodiments, each vertically oriented suspension element 230 and each horizontally oriented suspension element 240 may have some elasticity. Without limitation, each vertically oriented suspension element 230 and each horizontally oriented suspension element 240 may comprise a cable, a cord, a rope, or the like.

The vertically oriented suspension elements 230 may extend between the top pole and the bottom pole of the frame 100. More specifically, the suspension system 200 may include upper vertically oriented suspension elements 230 in a top portion of the frame 100 and lower vertically oriented suspension elements 230 at a lower elevation within the frame 100. An upper portion (e.g., an upper end, etc.) of each upper vertically oriented suspension element 230 may be secured to the upper anchor ring 220t. A central portion (e.g., a lower end, etc.) of each upper vertically oriented suspension element 230 may be secured to a passenger platform 210. Likewise, a central portion (e.g., an upper end, etc.) of each lower vertically oriented suspension element 230 may be secured to the passenger platform 210, while a lower portion (e.g., a lower end, etc.) of each lower vertically oriented suspension element 230 may be secured to the lower anchor ring 220b.

Each horizontally oriented suspension element 240 of the suspension system 200 may extend substantially horizontally across an interior of the frame 100. Opposite ends of each horizontally oriented suspension element 240 may be secured to opposed vertically oriented frame members 210. In some embodiments, the opposite ends of each horizontally oriented suspension member 240 may be secured to the horizontally oriented frame member 220. The horizontally oriented suspension elements 240 may extend beneath the platform 210 to support the platform 210 from below.

FIG. 2C illustrates embodiments of the manners in which the upper anchor ring 220t is secured to the frame 110, each vertically oriented suspension element 230 is coupled the upper anchor ring 220t, and the optional conveyor 500 is coupled to the upper anchor ring 220t. More specifically, a coupling element 222 may secure the upper anchor ring 220t to each vertically oriented frame member 110, a coupling element 234 may secure each vertically oriented suspension element 230 to the upper anchor ring 220t, and a coupling element 234 may secure the conveyor 500 to the upper anchor ring 220t. Each coupling element 222, 234, 236 may comprise webbing (i.e., nylon straps, etc.), o-rings, carabiners, etc., or combinations thereof that secure the elements of the suspension system 200 to the frame 110 in a manner that enable the suspension system 200 to perform its intended functions as the spherical compartment 10 (FIG. 1) is subjected to anticipated forces.

Figure 3B:
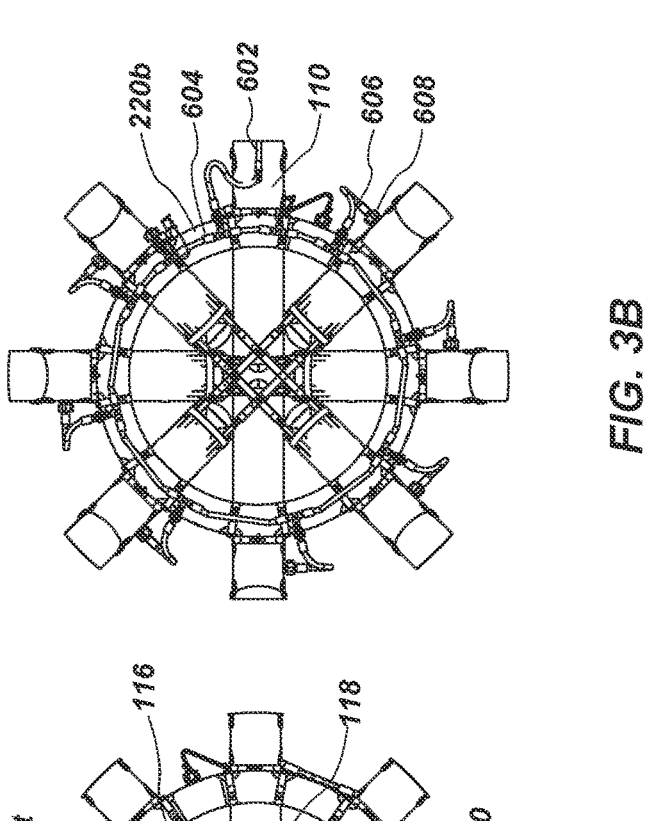
FIG. 3B is a plan view of a top anchor ring of the embodiment of frame shown in FIG. 2, taken along line E-E of FIG. 3.
Figure 3A:
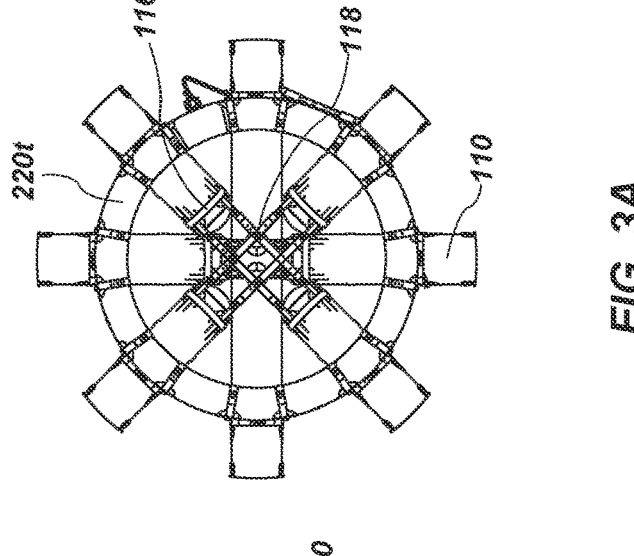
FIG. 3A is a plan view of the top anchor ring shown in FIG. 2A, taken along line D-D of FIG. 3.
Figure 3:
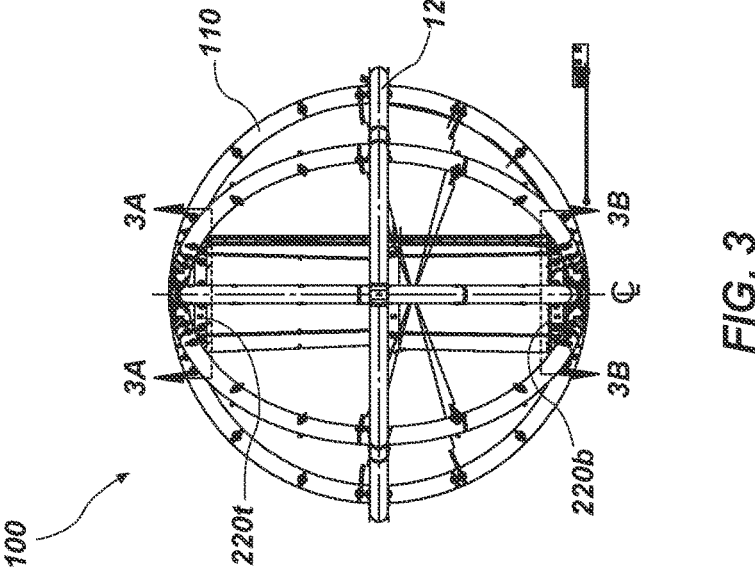
FIG. 3 is a front view of the embodiment of frame shown in FIG. 2.
Figure 4:
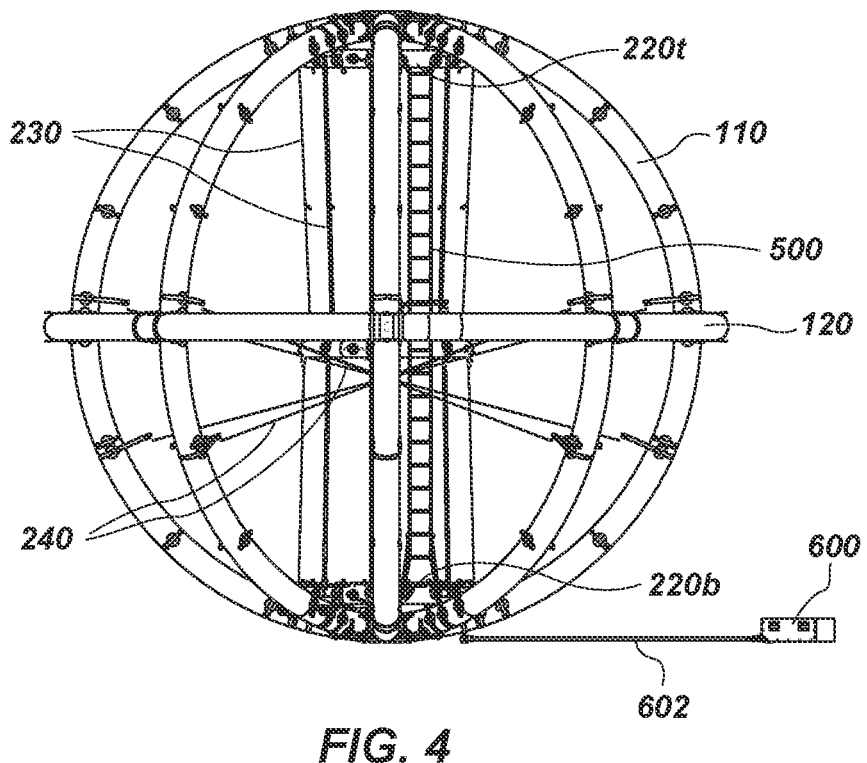
FIG. 4 is a side view of the embodiment of frame shown in FIG. 2.
Figure 5:
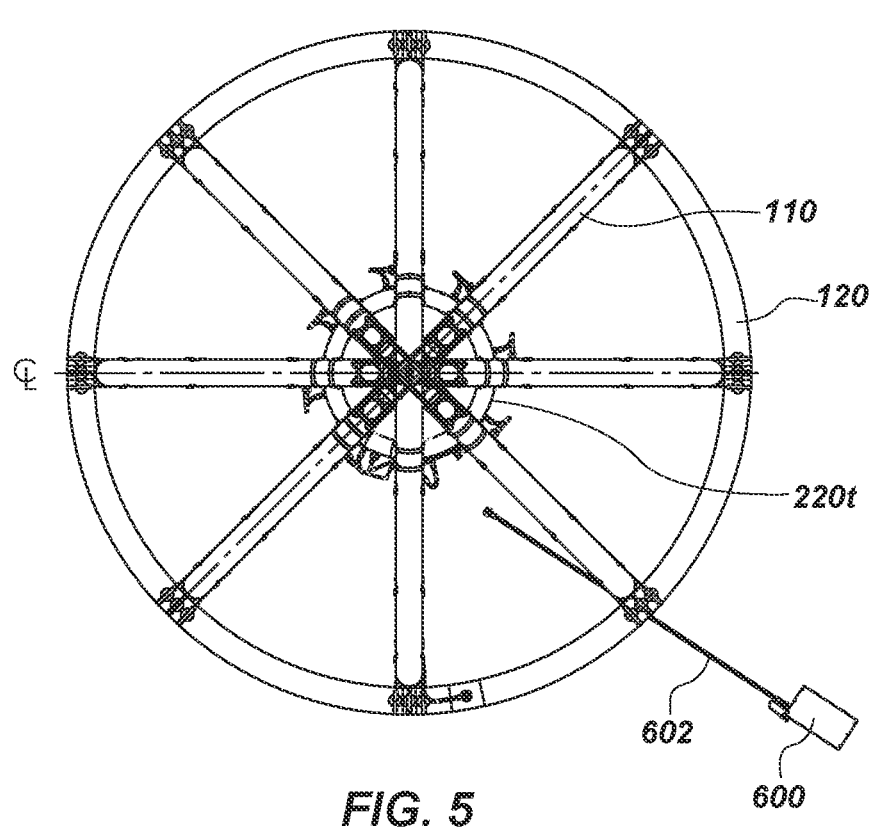
FIG. 5 is a top view of the embodiment of frame shown in FIG. 2.
Figure 6:
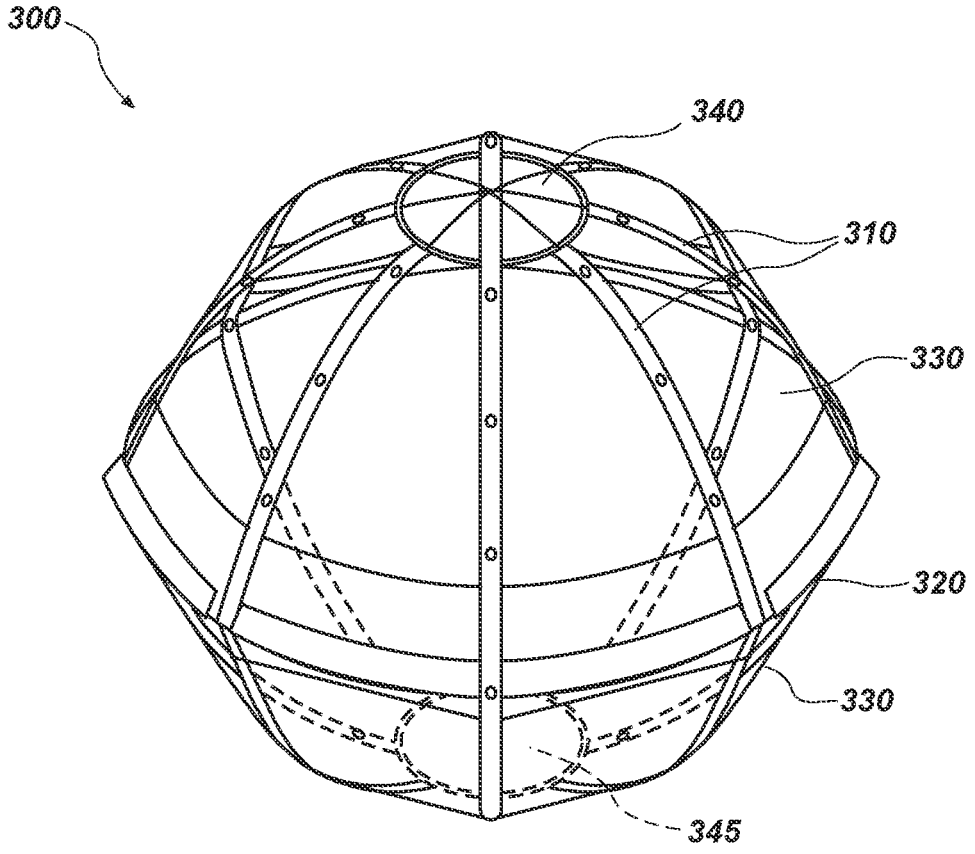
FIG. 6 is an isometric view of an embodiment of an outer skin of the embodiment of spherical compartment shown in FIG. 1.

FIG. 3B illustrates elements of an embodiment of a pressurization system according to this disclosure. The pressurization system includes a pump (FIGS. 1 and 4) that pressurizes a pressurizing fluid (e.g., air, an inert gas (e.g., nitrogen, etc.), a liquid, etc.). A primary conduit 602 conveys the pressurizing fluid from the pump 600. A manifold 604 receives the pressurizing fluid from the primary conduit 602 and then distributes the pressurizing fluid. As depicted, the manifold 604 may comprise a circular manifold carried by the lower anchor ring 220b. A plurality of secondary conduits 606 extend from the manifold 604 to each vertically oriented frame member 110 and each horizontally oriented frame member 120. A coupler 608 at an end of each secondary conduit 606 establishes communication between the secondary conduit 606 and the pressurizable interior of its corresponding vertically oriented frame member 110 or horizontally oriented frame member 120.

Turning now to FIGS. 6-10, an embodiment of an outer skin 300 of the spherical compartment 10 is illustrated. The outer skin 300 may include vertically oriented couplers 310, horizontally oriented couplers 320, a plurality of main panels 330, a top member 340, and a bottom member 345. Each vertically oriented coupler 310 may be secured to a corresponding vertically oriented frame member 110 (FIG. 3) in a suitable manner. Each horizontally oriented coupler 320 may be secured to a corresponding horizontally oriented frame member 120 (FIG. 3) in a suitable manner. Each main panel 330 may be positioned over an opening defined between adjacent vertically oriented frame members 110 and one or more horizontally oriented frame members 120. The top member 340 may be positioned over a top, or a top pole, of the frame 100 (FIG. 3), while the bottom member 345 may be positioned over a bottom, or a bottom pole, of the frame 100.

The outer skin 300 may have a structure that enables air to flow therein (e.g., it may comprise a breathable material, it may include mesh panels or similar structures that provide for airflow, etc.). In some embodiments, the shapes and manners in which the elements of the outer skin 300 are coupled to each other may enable the outer skin 300 to be stretched tight over the frame 100 (FIG. 3) or between the vertically oriented frame members 110 and horizontally oriented frame members 120 to prevent air resistance from collapsing the outer skin 330 while the spherical compartment falls from a significant height.

Each of the vertically oriented couplers 310, horizontally oriented couplers 320, main panels 330, top member 340, and bottom member 345 of the outer skin 300 may be formed from a flexible material. The material from which the elements of the outer skin 300 is formed and the manner in which the outer skin 300 is secured to the frame 100 may contribute to the structural stability of the spherical compartment 10 (FIG. 1). In some embodiments, the outer skin 300, or at least one of the main panels 330 thereof, may be translucent, at least partially transparent, or transparent. In a specific embodiment, the elements of the outer skin 300 may be formed from a translucent polyvinylchloride (PVC) or an optically clear polymer. More specifically, the elements of the outer skin 300 may be formed from a Type 2 PVC having a thickness of 16 mils (0.016 inch) (about 0.4 mm). Other outer skin 300 thicknesses are also within the scope of this disclosure. In other embodiments, the outer skin 300 may be made from a strong, lightweight fabric; for example, a fabric that may be used to make parachutes (e.g., a nylon, silk, etc.). A variety of other flexible materials (e.g., films, fabrics, etc.) may also be employed, as may a variety of more rigid materials.

Figures 7, 7A, 7B, 7C, 7D:
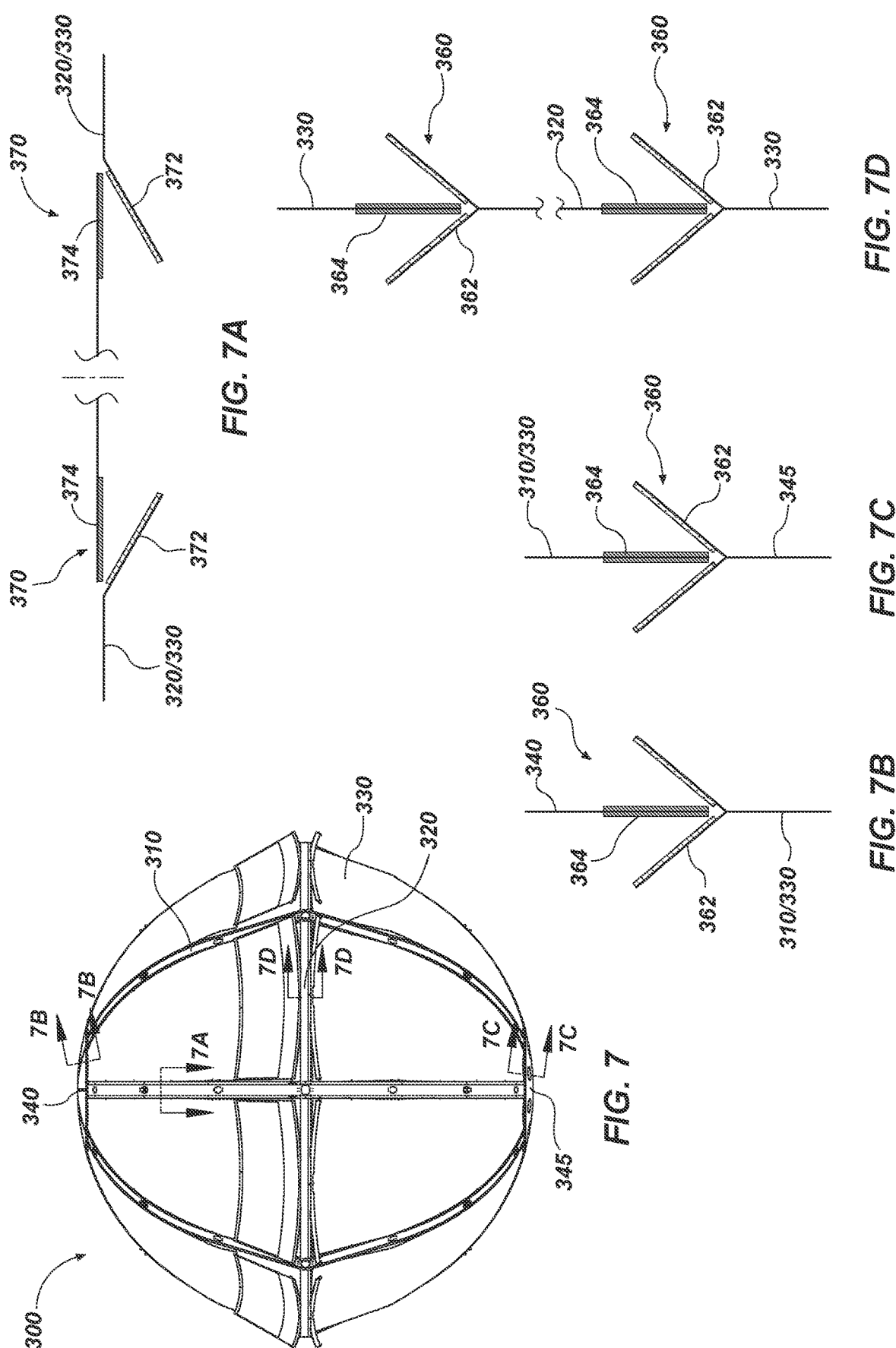
FIG. 7 is a front view of the embodiment of outer skin shown in FIG. 6.
FIGS. 7A-7D, taken along lines A-A through D-D, respectively, of FIG. 7, depict an embodiment of a manner in which adjacent panels of the embodiment of outer skin shown in FIG. 7 may be secured to each other.
Figure 8:
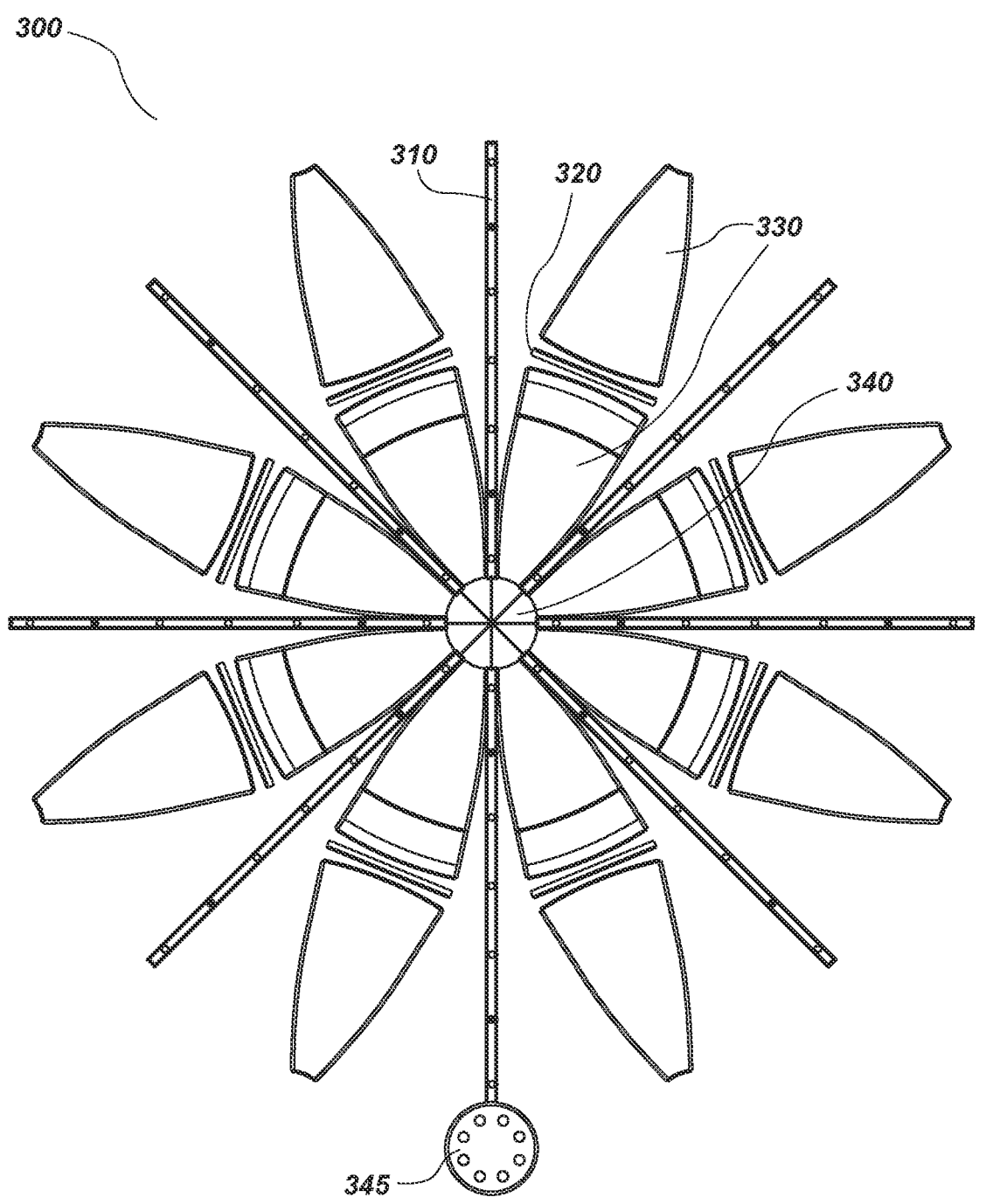
FIG. 8 is an exploded view showing various features of the embodiment of outer skin shown in FIG. 6.
Figure 9:
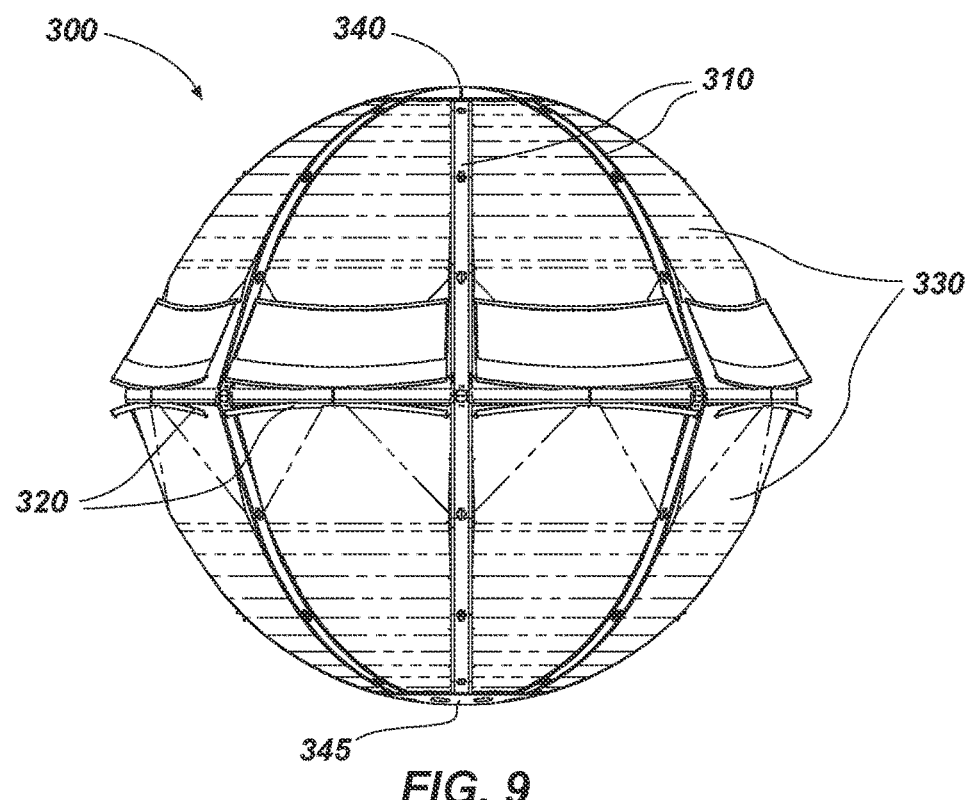
FIG. 9 is a side view of the embodiment of outer skin shown in FIG. 6.
Figure 10:
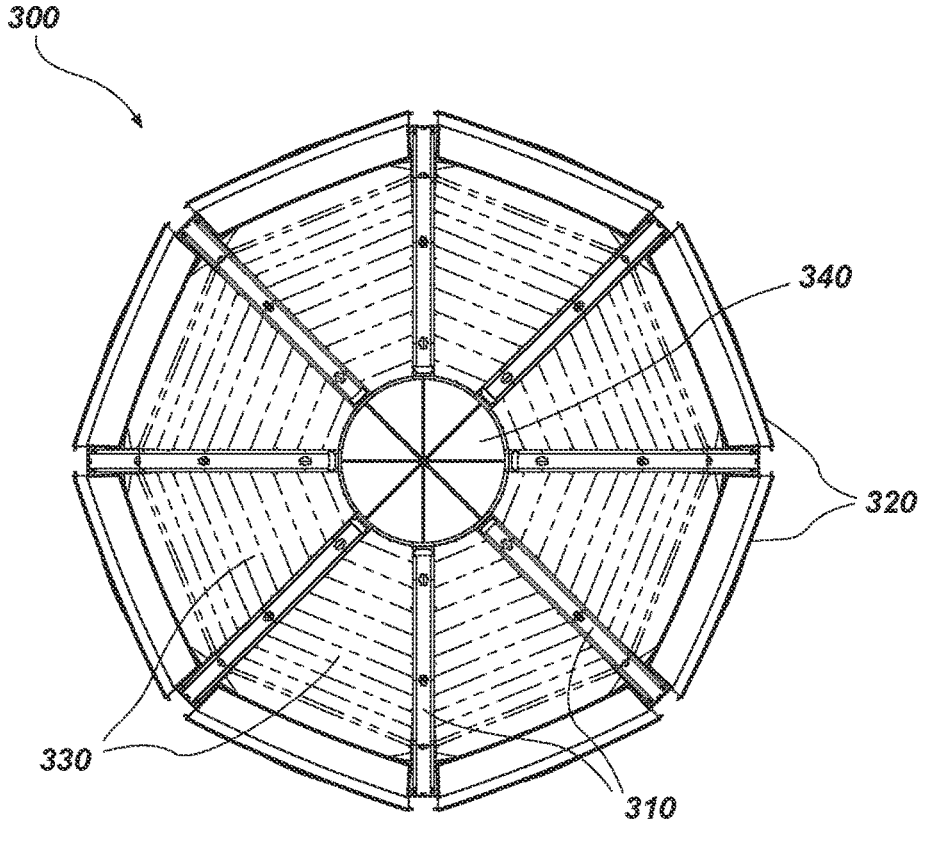
FIG. 10 is a top view of the embodiment of outer skin shown in FIG. 6.
Figure 11:
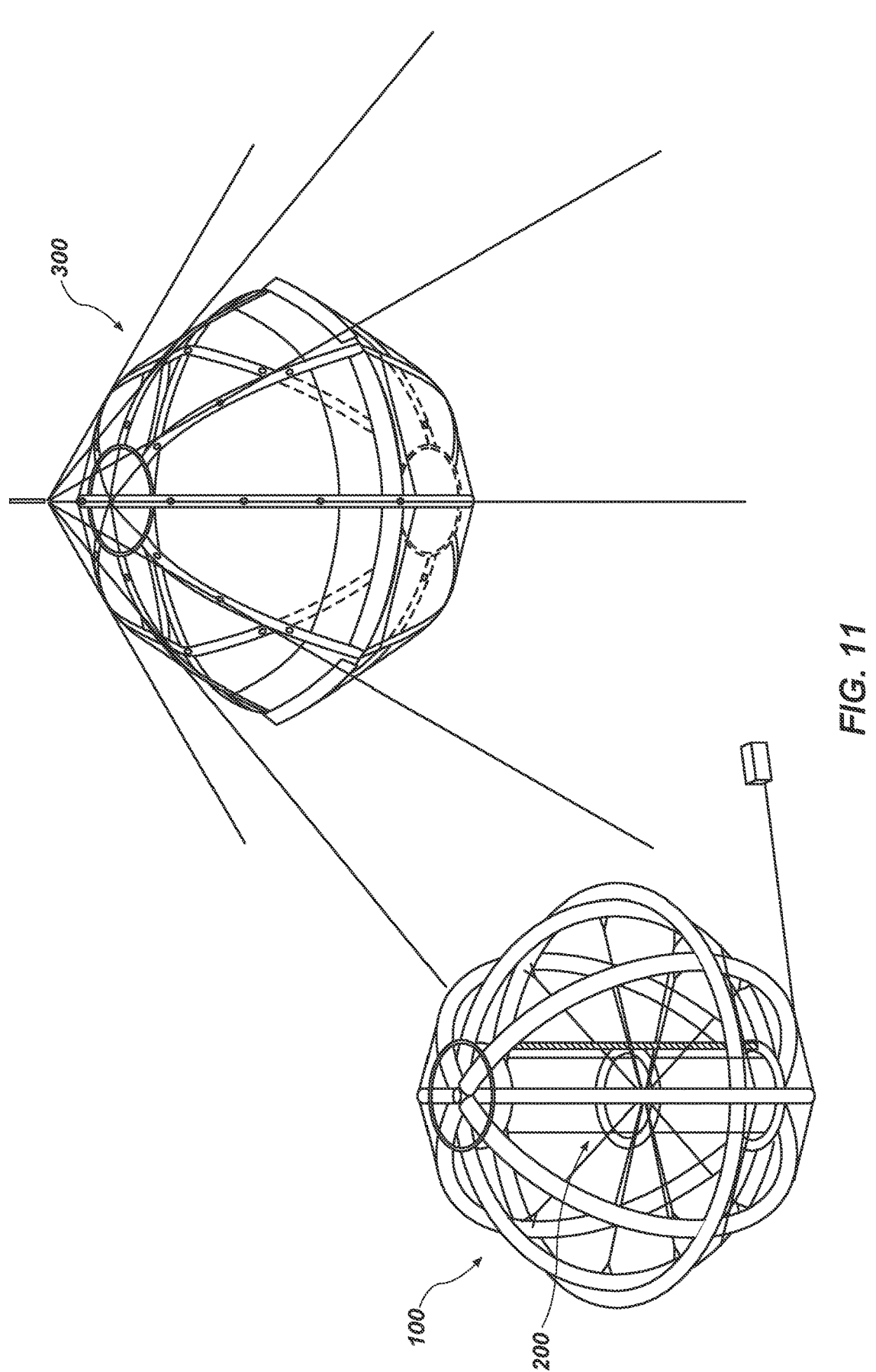
FIG. 11 is an isometric assembly view showing the embodiment of frame shown in FIG. 2 and the embodiment of outer skin shown in FIG. 6.
Figures 12, 13, 14, 15:
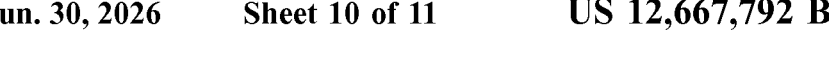
FIG. 12 is an isometric view of the embodiment of assembly shown in FIG. 11, with the frame and outer skin assembled with one another.
FIG. 13 is a front view of the embodiment of assembly shown in FIG. 12.
FIG. 14 is a side view of the embodiment of assembly shown in FIG. 12.
FIG. 15 is a front view of the embodiment of assembly shown in FIG. 12.

FIGS. 7A-7D illustrate specific but non-limiting embodiments of the way in which adjacent members of the outer skin 300 may be secured to each other. FIG. 7A illustrates an embodiment of fasteners 370 that may secure the ends of each horizontally oriented coupler 320 to a side of a vertically oriented coupler 310 and a vertical edge of each main panel 330 to a side of the vertically oriented coupler. Each fastener 370 may include a so-called touch fastener, with the vertically oriented couplers 310 comprising or carrying a first element of the touch fastener (e.g., hooks of a VELCRO touch fastener, etc.) and the ends of the horizontally oriented couplers 320 and vertical edges of the main panels 330 comprising or carrying a complementary, second element of the touch fastener (e.g., loops of the VELCRO touch fastener, etc.). Of course, fasteners 370 that comprise other suitable mechanisms may also be used.

FIGS. 7B-7D depict another embodiment of fastener 360, which includes a female element 362 and a male element 364. The female element 362 may comprise a pair of opposed first elements of a touch fastener. The male element 364 may comprise a pair of oppositely facing second elements of the touch fastener and may be received between the elements of the female element 362. FIG. 7B shows use of the fastener 360 to secure the top member 340 of the outer skin 300, which may comprise or carry the male element 364, to top ends of the vertically oriented couplers 310 at the top of the outer skin 300 and top edges of the main panels 330 at the top of the outer skin 300, which may comprise or carry the female element 362. FIG. 7C shows the use of the fastener 360 to secure the bottom panel 345 of the outer skin 300, which may comprise or carry the female element 362, to the bottom ends of the vertically oriented couplers 310 at the bottom of the outer skin 300 and bottom edges of the main panels 330 at the bottom of the outer skin 300, which may comprise or carry the male elements 364. FIG. 7D shows the use of the fastener 360 to secure the bottom edges of the main panels 330 at the top of the outer skin 300, which may comprise or carry the male element 364, to upper edges of the horizontally oriented couplers 320, which may comprise or carry the female element 362. FIG. 7D also shows the use of the fastener 360 to secure top edges of the main panels 330 at the bottom of the outer skin 300, which may comprise or carry the female element 362, to lower edges of the horizontally oriented couplers 320, which may comprise or carry the male element 364.

FIGS. 11-15 show assembled relationships of the frame 100, the suspension system 200, and the outer skin 300.

Figure 16:
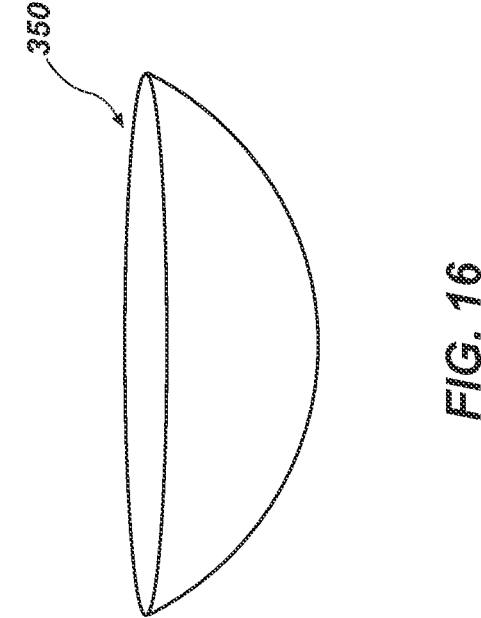
FIG. 16 is an isometric view of an embodiment of a ballast.
Figure 17:
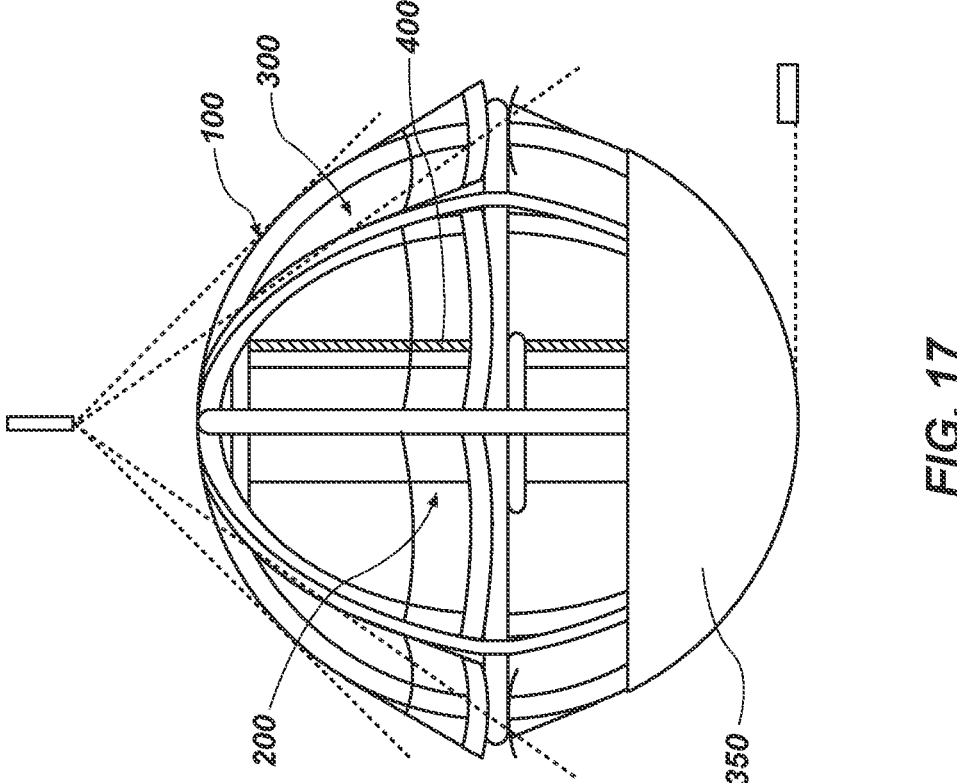
FIG. 17 illustrates the embodiment of ballast shown in FIG. 16 assembled with the embodiment of assembly shown in FIG. 12.

With reference now turned to FIGS. 16 and 17, an embodiment of the ballast 350 of a spherical compartment 10 (FIG. 1) according to this disclosure is illustrated. The ballast 350 may comprise a weighted member secured to the outer skin 300 and/or the frame 100 at or near the bottom thereof. As illustrated, the ballast 350 may be carried by an exterior of the spherical compartment 10. In a specific embodiment, the ballast may weigh about 250 pounds (about 115 kg).

Although this disclosure and the accompanying drawings provide many specifics, these should not be construed as limiting the scopes of any of the appended claims, but merely as providing information pertinent to some specific embodiments that may fall within the scopes of the appended claims. Features from different embodiments may be employed in combination. In addition, the scopes of the appended claims may encompass other embodiments. All additions to, deletions from, and modifications of the disclosed subject matter that fall within the scopes of the claims are to be embraced by the claims.

What is claimed:

1. A spherical compartment for an individual, comprising:
an airframe comprising a plurality of vertically oriented frame members with semicircular configurations, converging and joined to each other at a top pole and a bottom pole of the airframe, and arranged to define a frame for the spherical compartment with dimensions sufficient to accommodate the individual in a seated orientation, the airframe being rigid but compressible;
an outer skin comprising a flexible membrane around the airframe;
a plurality of suspension elements extending across an interior of the airframe, each suspension element comprising an elongated flexible member;
an upper anchor ring secured to upper portions of the plurality of vertically oriented frame members, adjacent to the top pole of the airframe, with upper ends of vertically oriented suspension elements of the plurality of suspension elements held in place by the upper anchor ring; and
a lower anchor ring secured to lower portions of the plurality of vertically oriented frame members, adjacent to the bottom pole of the airframe, with lower ends of vertically oriented suspension elements of the plurality of suspension elements held in place by the lower anchor ring; and
a passenger platform suspended substantially centrally within the airframe to accommodate the individual.

2. The spherical compartment of claim 1, wherein the airframe further comprises a horizontally oriented frame member.

3. The spherical compartment of claim 2, wherein the horizontally oriented frame member is positioned equatorially relative to the plurality of vertically oriented frame members.

4. The spherical compartment of claim 2, wherein the horizontally oriented frame member is secured to diametrically opposed locations of each vertically oriented frame member of the plurality of vertically oriented frame members.

5. The spherical compartment of claim 1, wherein each frame member of the airframe comprises a tubular member.

6. The spherical compartment of claim 5, wherein the tubular member comprises an inflatable tube.

7. The spherical compartment of claim 1, wherein the plurality of suspension elements further includes a plurality of horizontally oriented suspension elements.

8. The spherical compartment of claim 7, wherein each horizontally oriented suspension element extends across the airframe, from one vertically oriented frame member to an opposite vertically oriented frame member.

9. The spherical compartment of claim 7, wherein the passenger platform is at least partially supported by the plurality of horizontally oriented suspension elements.

10. The spherical compartment of claim 1, wherein the plurality of suspension elements are resiliently stretchable.

11. The spherical compartment of claim 1, wherein the outer skin is translucent or transparent.

12. The spherical compartment of claim 1, further comprising:

a ladder extending between the top pole and the bottom pole and positioned adjacent to the passenger platform.

13. The spherical compartment of claim 1, wherein a circle defined by a pair of vertically oriented frame members has an inner diameter of at least about 7.6 m.

14. The spherical compartment of claim 13, wherein each vertically oriented frame member has an outer diameter of at least about 36 cm.

* * * * *